A. N. HOWELL.
COVER FOR COOKING UTENSILS.
APPLICATION FILED JULY 6, 1910.

997,821.

Patented July 11, 1911.

2 SHEETS—SHEET 1.

Witnesses
E. Larson
Charles Wilson

Inventor
A. N. Howell
By Deebert Robb
Attorneys

COLUMBIA PLANOGRAPH CO., WASHINGTON, D. C.

A. N. HOWELL.
COVER FOR COOKING UTENSILS.
APPLICATION FILED JULY 6, 1910.

997,821.

Patented July 11, 1911.

2 SHEETS—SHEET 2.

Witnesses
E. Larson
Charles A. Wilson

Inventor
A. N. Howell
By Deeler & Robb
Attorneys

COLUMBIA PLANOGRAPH CO., WASHINGTON, D. C.

UNITED STATES PATENT OFFICE.

ALEXANDER N. HOWELL, OF LOS ANGELES, CALIFORNIA.

COVER FOR COOKING UTENSILS.

997,821.  Specification of Letters Patent.  Patented July 11, 1911.

Application filed July 6, 1910. Serial No. 570,572.

*To all whom it may concern:*

Be it known that I, ALEXANDER N. HOWELL, a citizen of the United States, residing at Los Angeles, in the county of Los Angeles and State of California, have invented certain new and useful Improvements in Covers for Cooking Utensils, of which the following is a specification.

This invention relates to cooking utensils, and is designed particularly to construct a cover for the same which will act as a steam cooker.

A further object is to construct a cover of this nature whereby the cooking utensil may be made substantially air-tight and at the same time providing a means whereby the steam accumulated in the utensil may be permitted to escape, thereby preventing the utensil from over-flowing.

With the above and other objects in view, this invention consists in the construction, combination, and arrangement of parts, all as hereinafter more fully described, claimed, and illustrated in the accompanying drawings, wherein—

Figure 1:
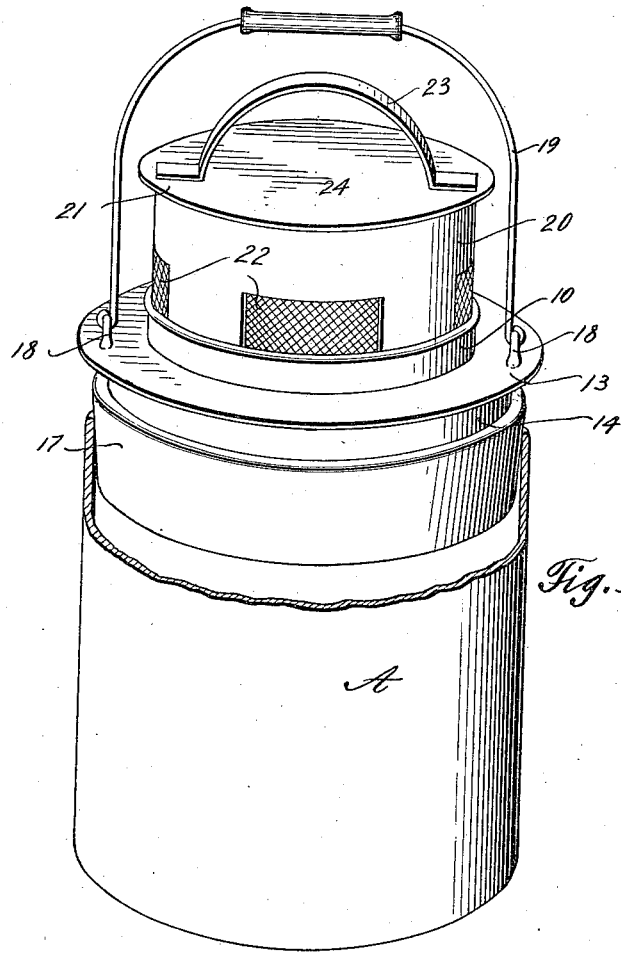
Figure 2:
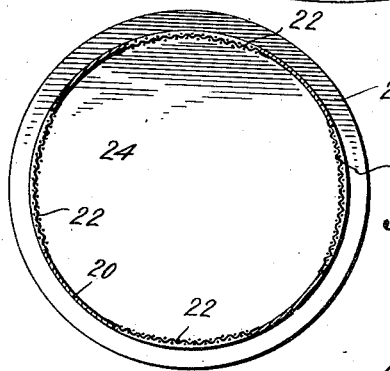
Figure 3:
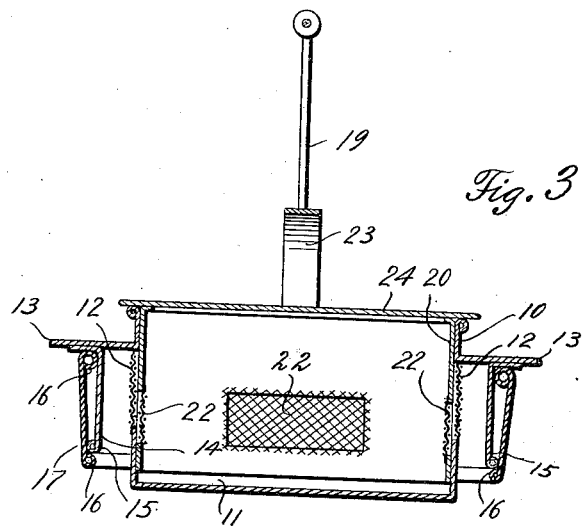
Figure 4:
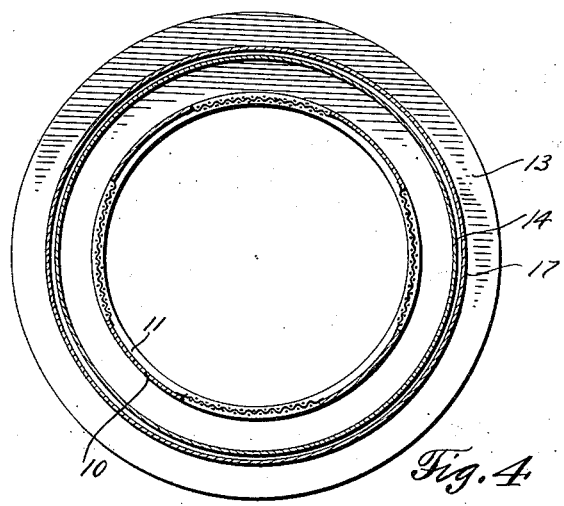

Figure 1 is a perspective view illustrating the present invention applied to a cooking vessel; Fig. 2 is a horizontal section of the removable cover of the main body portion thereof; Fig. 3 is a vertical section of the present invention; Fig. 4 is a horizontal section taken along the line 4—4 of Fig. 3.

In carrying out the present invention the main cylindrical body portion 10 is provided, said body portion forming a receptacle 11, having formed in the vertical wall thereof the spaced screened openings 12. Adjacent to the upper edge of the main body portion 10 is formed an outwardly extending horizontal flange 13 which carries the downwardly extending flange 14, said last named flange adapted to rest normally parallel to the receptacle 11 and spaced therefrom. The flange 14 has formed about its lower edge the outwardly extending bead 15 which secures the ring member 17 upon said flange. This ring member has an inwardly projecting bead 16 at the lower and upper edges thereof, one of said beads being disposed above the bead 15, while the lower bead 16 operates below the bead 15, thus permitting the member 17 to slide on the flange 14 at the same time being retained thereon by the bead 15. The flange 14 and the ring member 17 form a telescoping member which, together with the horizontal flange 13, form a supporting member for the receptacle. As the member 17 is constructed of spring material and adapted to rest within the mouth of the cooking vessel A, the same will rigidly retain the cover forming the subject matter of the present invention in place. From this construction it will be readily seen that as the ring member 17 rests within the mouth of the cooking vessel A, the steam will pass upwardly from said cooking utensil into the space between the flange 14 and the wall of the receptacle 11 and through the screened openings 12 into said receptacle.

The flange 13 has mounted thereon the diametrically disposed brackets 18 to which is pivoted the bail 19. A tubular cover 20 is adapted to be retained within the receptacle 11, said cover being provided with an outwardly extending flange 21 about the top 24 thereof, which forms a bearing surface for said cover. A series of spaced screened openings 22 are provided in the walls of the cover 20 and provide a means whereby, when the cover 20 is raised, the steam may pass from the receptacle 11 through the openings 22, thereby escaping. A handle 23 is centrally secured to the top 24 of the cover 20, thereby providing a means whereby said cover may readily be removed from the receptacle.

From the foregoing it will readily be seen that articles placed within the receptacle 11, when the device is in the position shown in Fig. 3 with the cover 20 entirely incased within said receptacle, will be thoroughly steamed and cooked and that when the cover 20 is raised to the position shown in Fig. 1 the steam will escape through the openings 22, thereby preventing the contents of the receptacle A from boiling over.

Having thus fully described my invention, what is claimed as new is:

1. The combination with a receptacle having steam openings in its sides, of a supporting member in spaced relation thereto and adapted to support said receptacle on a cooking vessel, and a cover for said receptacle provided with openings adapted to register with said steam openings, said openings in the cover being movable above and below the top of said receptacle for the purposes herein set forth.

2. In a device of the class described, the combination with a cooking vessel, of a receptacle having screened openings in the sides thereof, a horizontal flange carried by said receptacle, a downwardly extending flange carried by said last named flange, a ring member adjustably mounted on said downwardly extending flange and adapted to fit within the mouth of said cooking vessel, and a cover adapted to fit in said receptacle having screened openings therein to coincide with the screened openings in the receptacle.

3. The combination with a cooking vessel, of a receptacle provided with side openings and having a horizontal flange formed thereon, a downwardly extending flange carried by said horizontal flange, a bead located about said downwardly extending flange, a ring member adjustably mounted on said downwardly extending flange and adapted to fit within the mouth of said cooking vessel, a bead formed at the lower and upper terminals of said plate and disposed above and below the bead of said downwardly extending flange, and a cover movably carried in said receptacle and provided with openings adapted to register with said side openings, for the purposes herein set forth.

In testimony whereof I affix my signature in presence of two witnesses.

ALEXANDER N. HOWELL.

Witnesses:
C. C. NORTON,
C. P. BELL.

Copies of this patent may be obtained for five cents each, by addressing the "Commissioner of Patents, Washington, D. C."